United States Patent [19]

Sato et al.

[11] Patent Number: 5,340,496

[45] Date of Patent: Aug. 23, 1994

[54] STABILIZED SODIUM PERCARBONATE COMPOSITION

[75] Inventors: Kanji Sato; Tomomasa Kondo, both of Fuji, Japan

[73] Assignee: Tokai Denka Kogyo Kabushiki Kaisha, Tokyo, Japan

[21] Appl. No.: 29,987

[22] Filed: Mar. 12, 1993

Related U.S. Application Data

[63] Continuation of Ser. No. 549,442, Jul. 6, 1990, abandoned.

[30] Foreign Application Priority Data

Jul. 6, 1989 [JP] Japan .................. 1-173063

[51] Int. Cl.$^5$ .................. C01B 15/043; C01B 31/00
[52] U.S. Cl. .................. 252/186.27; 252/186.43; 252/95; 423/415.2
[58] Field of Search .................. 252/186.27, 186.32, 252/186.43; 423/415 P

[56] References Cited

U.S. PATENT DOCUMENTS

| | | | |
|---|---|---|---|
| 2,288,410 | 11/1940 | Lippman, Jr. | 252/186.27 |
| 3,847,830 | 11/1974 | Williams et al. | 252/186.27 |
| 4,064,062 | 12/1977 | Yurko | 252/186.27 |
| 4,444,674 | 4/1984 | Gray | 252/186.27 |
| 4,536,314 | 8/1985 | Hardy et al. | 252/102 |
| 4,964,870 | 10/1990 | Fong et al. | 252/186.38 |
| 4,978,770 | 12/1990 | Aoyagi et al. | 252/186.38 |
| 5,002,691 | 3/1991 | Bolkan et al. | 252/186.27 |
| 5,194,176 | 3/1993 | Copenhafer et al. | 252/186.27 |
| 5,219,549 | 6/1993 | Onda et al. | 423/415 P |

FOREIGN PATENT DOCUMENTS

| | | |
|---|---|---|
| 50-129500 | 10/1975 | Japan . |
| 59-194000 | 11/1984 | Japan . |
| 60-60907 | 4/1985 | Japan . |
| 60-118606 | 6/1985 | Japan . |
| 61-77607 | 4/1986 | Japan . |

*Primary Examiner*—Robert L. Stoll
*Assistant Examiner*—Joseph D. Anthony
*Attorney, Agent, or Firm*—Scully, Scott, Murphy & Presser

[57] ABSTRACT

A stabilized sodium percarbonate is obtained by incorporating therein (A) at least one compound selected from the group consisting of mono- and dicarboxylic acids having not less than four carbon atoms and salts thereof; and (B) at least one compound selected from the group consisting of sulfates, nitrates and silicates of alkali metals and alkaline earth metals.

29 Claims, No Drawings

STABILIZED SODIUM PERCARBONATE COMPOSITION

This is a continuation of copending application Ser. No. 07/549,42 filed on Jul. 6, 1990 now abandon.

BACKGROUND OF THE INVENTION

The present invention relates to a stabilized sodium percarbonate composition, particularly a stabilized sodium percarbonate composition suitable for use as a bleaching agent in detergents, etc.

Sodium percarbonate is generally used widely as a bleaching agent, a detergent, or a sterilizer. Sodium percarbonate as a bleaching agent is superior in solubility at low temperatures, exhibits a high bleaching effect, and is a stable compound in an ordinary perserved state. However, sodium percarbonate is disadvantageous in that it is unstable when preserved in a high humidity condition or when incorporated in a detergent. As a household detergent, a product containing a predetermined certain amount of sodium percarbonate as a bleaching agent is particularly preferred. When incorporated in a detergent, however, sodium percarbonate loses its stability upon contact with a zeolite which is used as a builder or with water contained in a very small amount in the detergent, resulting in that not only the sodium percarbonate no longer exhibits the bleaching effect but also there is fear of the detergent losing its effect. Various proposals have heretofore been made for solving these problems. For example in Japanese Patent Publication No. 56167/1988 there is disclosed a method wherein sodium percarbonate is coated with magnesium sulfonate or magnesium salt of sulfuric ester; in Japanese Patent Publication No. 57362/1988 there is disclosed a method wherein sodium percarbonate is coated with such magnesium salt plus sulfate or hydrochloride of an alkali or alkaline earth metal; in Japanese Patent Laid-Open No. 118606/1085 there is disclosed a method wherein sodium percarbonate is coated with boric acid or a partially neutralized borate and a water repellent; in Japanese Patent Laid-Open No. 194000/1984 a method wherein sodium percarbonate is coated with a borate and a magnesium compound; and in Japanese Patent Laid-Open No. 129500/1975 a method wherein sodium percarbonate is coated with a mixture of a surfactant and a water-insoluble compound which is compatible with the surfactant. All of these methods intend to prevent sodium percarbonate from coming into contact with detergent ingredients and to stabilize it by coating it with specific chemical substances. According to these conventional methods, however, when the sodium percarbonate thus coated is preserved in a high humidity condition or when incorporated in a detergent, the stabilization effect is not attained at all to a satisfactory extent in practical use.

It is the object of the present invention to solve the above-mentioned problem. The present inventors found that the aforesaid problem which had not been solved by the prior art could be overcome by incorporating in sodium percarbonate a mono- or dicarboxylic acid having not less than four carbon atoms or a salt thereof add a sulfate, nitrate or silicate of an alkali metal or alkaline earth metal. In this way we reached the present invention.

SUMMARY OF THE INVENTION

The present invention resides in a composition comprising sodium percarbonate and a stabilizer, the stabilizer consisting essentially of:
(a) at least one compound selected from the group consisting of mono- and dicarboxylic acids each having not less than four carbon atoms, and salts thereof; and
(b) at least one compound selected from the group consisting of sulfates, nitrates and silicates of alkali metals and alkaline earth metals.

This sodium percarbonate composition, as compared with the conventional sodium percarbonate, is remarkably improved in its stability during preservation in a high humidity condition or when incorporated in a detergent.

DETAILED DESCRIPTION OF THE INVENTION

Examples of mono and dicarboxylic acids each having not less than four carbon atoms which may be used in the present invention include saturated or unsaturated aliphatic, alicyclic or aromatic mono- or dicarboxylic acids having 4 to 20 carbon atoms. More concrete examples are butyric acid, isobutyric acid, valeric acid, caproic acid, caprylic acid, capric acid, lauric acid, myristic acid, palmitic acid, stearic acid, isostearic acid, arachic acid, behenic acid, lignoceric acid, cyclohexanecarboxylic acid, crotonic acid, 2-methylacrylic acid, sorbic acid, 2,4-pentadienoic acid, zoomaric acid, linolenic acid, linoleic acid, recinoleic acid, gadoleic acid, erucic acid, selacholeic acid, benzoic acid, diphenylacetic acid, toluic acid, p-t-butylbenzoic acid, phenylacetic acid, benzoylbenzoic acid, ethylbenzoic acid, 2,3,5-trimethylbenzoic acid, α-naphthoic acid, β-naphthoic acid, 2-methylnaphthoic acid, sebacic acid, undecanoic acid, dodecane-dicarboxylic acid, brassylic acid, detradecane-dicarboxylic acid, thapsinic acid, itaconic acid, muconic acid, naphthenic acid, beef tallow fatty acid, horse fat fatty acid, mutton tallow fatty acid, lard fatty acid, coconut oil fatty acid, palm oil fatty acid, palm kernel oil fatty acid, soybean oil fatty acid, linseed oil fatty acid, castor oil fatty acid, rice bran oil fatty acid, rape oil fatty acid, and hydrogenated such fatty acids.

Examples of salts of mono- and dicarboxylic acids each having not less than four carbon atoms which may be used in the present invention include sodium salts, potassium salts, magnesium salts and calcium salts of the $C_4$ or more mono- or dicarboxylic acids exemplified above.

Examples of sulfates, nitrates and silicates of alkali metals and alkaline earth metals which may be used in the present invention include sodium sulfate, potassium sulfate, magnesium sulfate, sodium nitrate, potassium nitrate, magnesium nitrate, calcium nitrate, sodium silicate (Nos. 1, 2 and 3), sodium metasilicate, sodium orthosilicate, and potassium silicate.

In the stabilizer used in the present invention, even if at least one compound selected from the group (A) or at least one compound selected from the group (B) is incorporated each alone in sodium percarbonate, there will not be obtained a satisfactory effect of stabilization. Only when both compounds are used together there is obtained a satisfactory effect.

It is preferable that the stabilizer components (A) and (B) in the present invention be used each in an amount of 0.5 to 20 wt %. If the amount thereof is smaller than 0.5 wt %, there will not be obtained a satisfactory effect, while if the amount thereof is larger than 20 wt %, the effective oxygen concentration will be decreased more than necessary although a satisfactory effect of stabilization will be obtained. More preferably, the stabilizer components (A) and (B) are used each in an amount of 2 to 10 wt %.

For preparing the composition of the present invention there may be adopted any method if only it permits uniform dispersion or incorporation of the stabilizer components (A) and (B) in sodium percarbonate. For example, the composition of the present invention can be prepared by mixing the compounds (A) and (B) with wet crystals obtained in a crystallization step and then granulating the resulting mixture. Or it can be prepared by dissolving the stabilizer components in water or an organic solvent and spraying the resulting solution onto flowing crystals or granules of sodium percarbonate followed by drying. A solution containing both compounds (A) and (B) may be sprayed in a single step, or separate solutions prepared using the compounds (A) and (B) respectively may be sprayed in two separate steps. Or one of the compounds (A) and (B) may be added at the time of granulation, while the other is sprayed as a solution. There also may be used conventional additives for sodium percarbonate such as stabilizers other than the one used in the present invention as well as granulation binders.

EXAMPLES

The present invention will be described below in more detail in terms of working Examples of the invention and Comparative Examples. But it is to be understood that the invention is not limited thereto.

EXAMPLES 1-29

Sodium carbonate and hydrogen peroxide were reacted together in an aqueous solution and the resulting crystals were separated by centrifugal filtration. Then, the resulting crystals of sodium percarbonate in a wet condition were mixed with a predetermined amount of each of the stabilizer components (A) shown in Table 1 in accordance with the corresponding composition ratio set forth also in the same table. The resulting mixture was extrusionwise granulated by means of a granulator equipped with a 1.0 mm mesh wire gauze, followed by drying. 200 g of the granules thus obtained were fed into a rotary vacuum dryer equipped with a spray coated and a 10–25% aqueous solution of the corresponding stabilizer component (B) shown in Table 1 was sprayed to the granules little by little while heating was made to 70° C. under reduced pressure in accordance with the corresponding composition ratio set forth in the same table. After termination of the spraying, the composition thus obtained was dried for 20 minutes. In this way there were prepared sodium percarbonate compositions in accordance with the composition ratios described in Table 1, which compositions were found to range in effective oxygen concentration from 12.5% to 13.5%. Then, the compositions were each mixed 2 g with 2 g of a powdered zeolite for detergent intimately and the resulting mixtures were allowed to stand for 48 hours under the conditions of 50° C. and a relative humidity of 80%, then determined for residual effective oxygen concentrations, from which the respective stabilities were calculated. The results are as set out in Table 1. The determination of effective oxygen concentration was performed according to an iodometric titration method. For comparison purpose, the same test was conducted also with respect to the use of sodium percarbonate not containing any stabilizer and the use of each stabilizer component alone, and the results obtained are shown as Comparative Examples in Table 1.

TABLE 1

| | | Composition Ratio (%) | | | | | |
|---|---|---|---|---|---|---|---|
| No. | Sodium Percarbonate | Stabilizer Component (A) | | Stabilizer Component (B) | | Stability (%) | |
| Ex. | | | | | | | |
| 1 | 90 | caproic Acid | 5 | magnesium | 5 | 69 | |
| 2 | 90 | " | 5 | " | 5 | 71 | |
| 3 | 90 | cyclohexane-carboxylic acid | 5 | " | 5 | 70 | |
| 4 | 90 | lauric acid | 5 | magnesium | 5 | 73 | |
| 5 | 90 | myristic acid | 5 | sodium sulfate | 5 | 73 | |
| 6 | 90 | palmitic acid | 5 | sodium sulfate | 5 | 75 | |
| 7 | 90 | stearic acid | 5 | potassium sultate | 5 | 70 | |
| 8 | 90 | behenic acid | 5 | sodium nitrate | 5 | 69 | |
| 9 | 90 | linolenic acid | 5 | magnesium nitrate | 5 | 72 | |
| 10 | 90 | " | 5 | magnesium nitrate | 5 | 75 | |
| 11 | 90 | recinoleic acid | 5 | magnesium sulfate | 5 | 76 | |
| 12 | 90 | p-toluic acid | 5 | magnesium sulfate | 5 | 78 | |
| 13 | 90 | phenylacetic acid | 5 | magnesium sulfate | 5 | 79 | |
| 14 | 92 | beef tallow fatty acid | 5 | magnesium sulfate | 3 | 73 | |
| 15 | 92 | horse fat fatty acid | 5 | magnesium sulfate | 3 | 72 | |
| 16 | 94 | mutton tallow fatty acid | 5 | sodium silicate (No. 3) | 1 | 70 | |
| 17 | 93 | lard fatty acid | 5 | potassium silicate | 2 | 72 | |
| 18 | 90 | coconut oil fatty acid | 5 | sodium sulfate | 5 | 75 | |
| 19 | 90 | palm kernel oil fatty acid | 5 | sodium sulfate | 5 | 75 | |
| 20 | 90 | soybean oil fatty acid | 5 | sodium sulfate | 5 | 77 | |
| 21 | 94 | linseed oil fatty acid | 5 | sodium silicate (No. 3) | 1 | 73 | |
| 22 | 94 | rice bran oil fatty acid | 5 | sodium silicate (No. 3) | 1 | 75 | |
| 23 | 94 | hydrogenated beef tallow fatty acid | 5 | sodium silicate (No. 3) | 1 | 76 | |
| 24 | 92 | hydrogenated horse fat fatty acid | 5 | magnesium sulfate | 3 | 77 | |
| 25 | 92 | naphthenic acid (#125) | 5 | magnesium sulfate | 3 | 72 | |
| 26 | 92 | sodium oleate | 5 | magnesium sulfate | 3 | 77 | |
| 27 | 90 | potassium oleate | 5 | sodium sulfate | 5 | 73 | |
| 28 | 90 | magnesium oleate | 5 | sodium sulfate | 5 | 78 | |
| 29 | 90 | calcium oleate | 5 | sodium sulfate | 5 | 74 | |
| Comp. Ex. | | | | | | | |
| 1 | 100 | — | | — | | 20 | |
| 2 | 95 | — | | magnesium sulfate | 5 | 25 | |
| 3 | 99 | — | | sodium | 1 | 33 | |

TABLE 1-continued

| No. | Sodium Percarbonate | Composition Ratio (%) | | | | Stability (%) |
|---|---|---|---|---|---|---|
| | | Stabilizer Component (A) | | Stabilizer Component (B) | | |
| | | | | silicate (No. 3) | | |
| 4 | 95 | beef tallow fatty acid | 5 | — | | 40 |
| 5 | 95 | sodium oleate | 5 | — | | 39 |
| 6 | 99.4 | beef tallow fatty acid | 0.3 | magnesium sulfate | 0.3 | 45 |
| 7 | 99.4 | p-toluic acid | 0.3 | sodium sulfate | 0.3 | 43 |

EXAMPLES 30–49

200 g of 16 to 80 mesh granules of dried sodium percarbonate obtained by extrusive granulation were fed into a rotary vacuum dryer equipped with a spray coater and a 10–255 aqueous solution of each of the stabilizer components (B) shown in Table 2 was sprayed to the granules little by little while heating was made to 70° C. under reduced pressure until a predetermined amount thereof was incorporated in the granules. Then, a 10–30% solution in ethanol of each of the stabilizer components (A) shown in the same table was sprayed in the same manner as above until a predetermined amount thereof was incorporated in the granules. After termination of the spraying, the composition thus obtained was dried for 10 minutes. In this way there were prepared sodium percarbonate compositions in accordance with the composition ratios described in Table 2, which compositions were found to range in effective oxygen concentration from 12.0% to 13.5%. Then, the compositions were determined for stability in the same way as in Examples 1–29. The results are as set forth in Table 2.

TABLE 2

| No. | Sodium Percarbonate | Composition Ratio (%) | | | | Stability (%) |
|---|---|---|---|---|---|---|
| | | Stabilizer Component (A) | | Stabilizer Component (B) | | |
| Ex. | | | | | | |
| 30 | 92 | crotonic acid | 5 | magnesium sulfate | 3 | 72 |
| 31 | 92 | 2-methylacrylic acid | 5 | magnesium fatty acid | 3 | 73 |
| 32 | 92 | sorbic acid | 5 | magnesium sulfate | 3 | 70 |
| 33 | 90 | α-naphthoic acid | 5 | sodium sulfate | 5 | 77 |
| 34 | 90 | sebacic acid | 5 | sodium sulfate | 5 | 70 |
| 35 | 90 | didecane-dicarboxylic acid | | sodium sulfate | 5 | 80 |
| 36 | 90 | tetradecane-dicarboxylic acid | | sodium sulfate | 5 | 81 |
| 37 | 90 | muconic acid | 5 | sodium sulfate | 5 | 72 |
| 38 | 90 | beef tallow fatty acid | 5 | magnesium sulfate | 5 | 81 |
| 39 | 90 | beef tallow fatty acid | 5 | sodium sulfate | 5 | 76 |
| 40 | 93 | beef tallow fatty acid | 5 | sodium silicate (No.2) | 2 | 75 |
| 41 | 93 | beef tallow fatty acid | 5 | sodium sulfate | 2 | 72 |
| 42 | 92 | beef tallow | 5 | magnesium nitrate | 3 | 70 |
| 43 | 91.5 mixture | beef tallow soda soap 80% coconut oil soda soap 20% | 5 | sodium silicate (No. 3) sodium sulfate | 0.5 3 | 80 |
| 44 | 92.5 | benzoic acid naphthenic acid (#125) beef tallow fatty acid | 1 1 2 | sodium silicate (No. 3) sodium sulfate | 0.5 3 | 83 |
| 45 | 94 | benzoic acid | 1 | magnesium sulfate | 5 | 69 |
| 46 | 90 | ″ | 5 | magnesium sulfate | 5 | 79 |
| 47 | 85 | ″ | 10 | magnesium sulfate | 5 | 85 |
| 48 | 98 | ″ | 0.5 | sodium sulfate sodium silicate (No. 3) | 1 0.5 | 67 |
| 49 | 99 | beef tallow fatty acid | 0.5 | sodium silicate | 0.5 | 63 |

TABLE 2-continued

| | | Composition Ratio (%) | | |
|---|---|---|---|---|
| No. | Sodium Percarbonate | Stabilizer Component (A) | Stabilizer Component (B) | Stability (%) |
| | | | (No. 3) | |

What is claimed is:

1. Stable sodium percarbonate crystals or granules consisting essentially of sodium percarbonate and the following components (A) and (B) uniformly incorporated therein:
   (A) at least one compound selected from the group consisting of mono- and dicarboxylic acids having not less than four carbon atoms and salts thereof; and
   (B) at least one compound selected from the group consisting of sulfates, nitrates and silicates of alkali metals and alkaline earth metals, said component (A) and said component (B) each being present in an amount which is effective, in combination with the other component, to provide a stabilization effect to the sodium percarbonate.

2. Stable sodium percarbonate as set forth in claim 1, wherein the content of the component (A) and that of the component (B) are each in the range of 0.5 to 20% by weight.

3. Stable sodium percarbonate as set forth in claim 1, wherein the component (A) is a saturated or unsaturated, aliphatic, alicyclic or aromatic mono- or dicarboxylic acid having 4 to 20 carbon atoms.

4. Stable sodium percarbonate as set forth in claim 1, wherein the salts in the component (A) are sodium salt, potassium salt, magnesium salt or calcium salt.

5. Stable sodium percarbonate as set forth in claim 1, wherein the component (B) is selected from the group consisting of sodium sulfate, potassium sulfate, magnesium sulfate, sodium nitrate, potassium nitrate, magnesium nitrate, calcium nitrate, sodium silicate, sodium metasilicate, sodium orthosilicate, and potassium silicate.

6. Stable sodium percarbonate as in claim 1, wherein the sodium percarbonate is in the form of particles
   (a) first admixed with one of components (A) and (B) and then coated with the other of components (A) and (B), or
   (b) first coated with one of components (A) and (B) and then admixed with the other of components (A) and (B).

7. Stable sodium percarbonate as in claim 1, wherein the sodium percarbonate is in the form of particles coated from a solution of components (A) and (B).

8. Stable sodium percarbonate as in claim 1, wherein component (A) is the sodium, potassium or magnesium salt of oleic acid.

9. A Stable sodium percarbonate as in claim 8, wherein components (A) and (B) are each in the range of 0.5 to 20% by weight.

10. Stable sodium percarbonate as in claim 1, wherein component (B) is sodium silicate or sodium sulfate.

11. Stable sodium percarbonate as in claim 10, wherein components (A) and (B) are each in the range of 0.5 to 20% by weight.

12. Stable sodium percarbonate as in claim 1, wherein component (A) is the sodium, potassium or magnesium salt of oleic acid and component (B) is sodium silicate or sodium sulfate.

13. Stable sodium percarbonate as in claim 12, wherein components (A) and (B) are each in the range of 0.5 to 20% by weight.

14. Stable sodium percarbonate as in claim 1, wherein component (A) is the sodium salt of oleic acid and component (B) is sodium sulfate.

15. Stable sodium percarbonate as in claim 14, wherein components (A) and (B) are each in the range of 0.5 to 20% by weight.

16. Stable sodium percarbonate as set forth in claim 1, wherein the sodium percarbonate is in the form of particles coated with components (A) and (B).

17. A bleaching detergent composition comprising a bleaching effective amount of the stable sodium percarbonate of claim 16 in combination with a detergent effective amount of surfactant.

18. A bleaching detergent in accordance with claim 17 including a zeolite.

19. A method of stabilizing sodium percarbonate prior to being incorporated in a detergent composition to prevent the sodium percarbonate from decomposing and losing stability upon contact with a zeolite or moisture present in the detergent composition, said method comprising:
   uniformly incorporating a composition consisting essentially of components (A) and (B) in crystals or granules of sodium percarbonate to provide a stable sodium percarbonate composition, said component (A) being at least one compound selected from the group consisting of mono and dicarboxylic acids having not less than four carbon atoms and salts thereof, and said component (B) being at least one compound selected from the group consisting of sulfates, nitrates and silicates of alkali metals and alkaline earth metals, said component (A) and said component (B) each being present in an amount which is effective, in combination with the other component, to provide a stabilizing effect to the sodium percarbonate.

20. A method according to claim 19, wherein the step of uniformly incorporating comprises:
   mining components (A) and (B) with wet crystals or granules of sodium percarbonate and
   (b) granulating the resultant mixture.

21. A method according to claim 19, wherein the step of uniformly incorporating comprises:
   (a) dissolving components (A) and (B) in water or an effective organic solvent,
   (b) spraying the resultant solution on crystals or granules of sodium percarbonate and
   (c) drying the coated crystals or granules of sodium percarbonate.

22. A method according to claim 19, wherein the step of uniformly incorporating comprising:
   (a) dissolving component (A) in water or an effective organic solvent,
   (b) dissolving component (B) in water or an effective organic solvent,
   (c) spraying one of the resultant solutions of component (A) or component (B) on crystals or granules of sodium percarbonate, (d) spraying the other resultant solution of component (A) or component (B) on the wetted crystals or granules of sodium percarbonate from step (c), and (e) drying the coated crystals or granules of sodium percarbonate.

23. A method according to claim 19, wherein the step of uniformly incorporating comprises:

(a) mixing component (A) with wet crystals or granules of sodium percarbonate, (b) dissolving component (B) in water or an effective organic solvent, (c) spraying the resultant solution of component (B) on the crystals or granules of sodium percarbonate resulting from step (a) and (d) drying the crystals or granules of sodium percarbonate resulting from step (c).

24. A method according to claim 19, wherein the step of uniformly incorporating comprises:

(a) mixing component (B) with wet crystals or granules of sodium percarbonate, (b) dissolving component (A) in water or an effective organic solvent, (c) spraying the resultant solution of component (A) on the crystals or granules of sodium percarbonate resulting from step (a) and (d) drying the crystals or granules of sodium percarbonate resulting from step (c).

25. A method according to claim 19, wherein the content of component (A) and that of component (B) are each in the range of 0.5 to 20% by weight of the stable sodium percarbonate composition.

26. A method according to claim 19, wherein component (A) is the sodium, potassium or magnesium salt of oleic acid.

27. A method according to claim 19, wherein component (B) is sodium silicate or sodium sulfate.

28. A method according to claim 19, wherein component (A) is the sodium, potassium or magnesium salt of oleic acid and component (B) is sodium silicate or sodium sulfate.

29. A method according to claim 19, wherein component (A) is the sodium salt of oleic acid and component (B) is sodium sulfate.

* * * * *